(12) United States Patent
Hur et al.

(10) Patent No.: US 7,152,925 B2
(45) Date of Patent: Dec. 26, 2006

(54) DETACHABLE SEAT FOR AUTOMOBILES

(75) Inventors: Jae-Myung Hur, Anyang-Si (KR); Do-Kywn Kim, Seoul (KR)

(73) Assignee: Dae Won San Up Co., Ltd (KR)

( * ) Notice: Subject to any disclaimer, the term of this patent is extended or adjusted under 35 U.S.C. 154(b) by 0 days.

(21) Appl. No.: 10/976,795

(22) Filed: Nov. 1, 2004

(65) Prior Publication Data
US 2006/0012231 A1 Jan. 19, 2006

(30) Foreign Application Priority Data
Jul. 13, 2004 (KR) ............... 10-2004-0054278

(51) Int. Cl.
*B60N 2/36* (2006.01)
(52) U.S. Cl. ............... 297/378.13; 297/331; 297/335; 297/336; 296/65.03; 296/95.09; 296/65.13
(58) Field of Classification Search .......... 297/378.13, 297/331, 335, 336; 296/65.03, 65.09, 65.13
See application file for complete search history.

(56) References Cited

U.S. PATENT DOCUMENTS

| | | | | |
|---|---|---|---|---|
| 4,865,377 A | * | 9/1989 | Musser et al. ........... 296/65.03 |
| 5,626,391 A | * | 5/1997 | Miller et al. ............... 297/331 |
| 5,743,596 A | * | 4/1998 | Chabanne ............... 297/336 X |
| 5,765,894 A | * | 6/1998 | Okazaki et al. .......... 296/65.03 |
| 5,951,086 A | * | 9/1999 | Hoshino et al. .......... 296/65.03 |
| 5,961,183 A | * | 10/1999 | Smith et al. ......... 297/65.03 X |
| 6,036,252 A | * | 3/2000 | Hecksel et al. .......... 296/65.03 |
| 6,065,804 A | * | 5/2000 | Tanaka et al. ............... 297/336 |
| 6,152,515 A | * | 11/2000 | Wieclawski ............... 296/65.03 |
| 6,183,032 B1 | * | 2/2001 | Champ ..................... 296/65.03 |
| 6,196,611 B1 | * | 3/2001 | Lee .......................... 296/65.03 |
| 6,213,525 B1 | * | 4/2001 | Nicola ................. 292/65.03 X |
| 6,250,842 B1 | * | 6/2001 | Kruger .................... 297/335 X |
| 6,375,246 B1 | * | 4/2002 | Nicola et al. ............ 296/65.03 |
| 6,523,899 B1 | * | 2/2003 | Tame ..................... 297/336 X |
| 2004/0017091 A1 | * | 1/2004 | Hur et al. ................ 296/65.03 |

* cited by examiner

*Primary Examiner*—Rodney B White
(74) *Attorney, Agent, or Firm*—Arent Fox PLLC

(57) ABSTRACT

A detachable seat for automobiles that folds and tumbles in a single operation while being firmly maintained in a desired position via a seat slide unit. The seat slide unit is fastened along a central line of a lower end thereof to an automobile body and includes an inside long slide rail and an outside long slide rail. The detachable seat also includes a seat detachment unit having a seat frame with rotatably mounted front and rear locks that are coupled to the inside long slide rail such that the front and rear locks rotate simultaneously. The detachable seat further includes a seat tumbling unit coupled to the rear lock of the seat detachment unit for simultaneously folding the detachable seat and unlocking the rear lock. The seat tumbling unit both folds a seat back part of the detachable seat and tumbles the detachable seat.

9 Claims, 15 Drawing Sheets

DETACHABLE SEAT FOR AUTOMOBILES

BACKGROUND OF THE INVENTION

1. Field of the Invention

The present invention relates generally to detachable seats for automobiles, and more particularly, to a detachable seat for an automobile, which has a structure capable of sliding forwards and backwards in the automobile, and is automatically tumbled at the same time that the seat back part of the detachable seat is folded.

2. Description of the Related Art

As well known to those skilled in the art, seats for automobiles serve to absorb vibration transferred from the outside, thus reducing fatigue of drivers and passengers, and being comfortable to the drivers and passengers. Furthermore, each seat occupies a large percentage of the automobile in terms of weight and cost. Therefore, the seats must be light and economical. In addition, the seats must have appearances and sizes suitable for every driver and passenger. Moreover, because the seats occupy a large portion of the passenger compartment of the automobile, the seats must be superior in design. Recently, due to improvements in living standards and a reduction in working time, leisure automobiles for use in leisure time are gaining popularity. The leisure automobiles each must have sufficient space therein to load baggage during travel such as family travel.

Conventional automobiles have interior space for passengers in addition to separate space for loading baggage. To load relatively large baggage into the conventional automobiles, rear seats are folded or removed from the automobiles to obtain sufficient space. However, in the case of folding the rear seats for loading large baggage, because the large baggage comes into direct contact with the rear seats, the baggage or rear seats may be damaged. To avoid the above-mentioned problems, the rear seats may be removed from the automobiles for loading large baggage into the automobiles.

In a detailed description, in the case that each of the rear seats is folded or double-folded, a seat back part of the rear seat is folded onto a seat cushion part by a seat reclining device. After the seat back part is folded onto the seat cushion part, the seat cushion part is unlocked from a striker on the frame of the automobile. Thereafter, the folded rear seat is stood on end right behind the front seat. However, in the conventional rear seat, the seat back and seat cushion parts are moved in two separate operations, thus being inconvenient to a user. Furthermore, even though some space is obtained by folding the rear seat in the automobile, since the rear seat is still placed in the automobile, sufficient space for loading large baggage may not be obtained.

To solve the above-mentioned problems caused by the complex double operation, a seat having a structure in which a seat back part is unlocked and a seat cushion part is detached from an automobile through a single operation has been proposed. This seat can be used as a table while the seat back part is folded on the seat cushion part. However, when the seat back part is returned to its original state after the use of the seat back part as a table is finished, a connecting cable of the automobile body may interfere in the locking of the seat back part to the automobile body. Therefore, the seat cushion part may be not firmly fastened to the automobile body, thus undesirably moving.

In an effort to overcome the above-mentioned problems, another detachable rear seat was proposed. This detachable rear seat includes an insert device which has a coupling unit and is provided on a front end of a frame attached under a lower surface of a seat cushion part, and a fastening device which has an elastic ball striker and is provided on a rear end of the frame. A locking unit, comprising a lock and a housing with a movable link to move the lock, is mounted on a floor panel of the automobile to removably couple the insert device to the floor panel. A striker is also mounted on the floor panel to removably couple the fastening device to the floor panel. However, in the conventional detachable rear seat, after a user removes the rear seat from the automobile, the user must carry the removed rear seat from the automobile to a desired location. Therefore, in the case of old or feeble persons, many difficulties exist in carrying and using of the removed rear seat.

SUMMARY OF THE INVENTION

Accordingly, the present invention has been made keeping in mind the above problems occurring in the prior art, and an object of the present invention is to provide a detachable seat for automobiles which is easily and removably mounted to an automobile body, and is folded and tumbled in a single operation by one touch system and, as well, can be firmly maintained in a desired position due to a slide coupling structure of a seat slide unit.

In order to accomplish the above object, the present invention provides a detachable seat for automobiles, including: a seat slide unit fastened along a central line of a lower end thereof to an automobile body, with both an inside long slide rail and an outside long slide rail coupled together through a slide coupling structure; and a seat detachment unit. The seat detachment unit has front and rear locks coupled at predetermined positions to the inside long slide rail of the seat slide unit and rotatably mounted to a seat frame of the detachable seat, so that the front and rear locks are simultaneously rotated. The detachable seat further includes a seat tumbling unit provided at a predetermined position on the detachable seat while being coupled to the rear lock of the seat detachment unit, thus folding the detachable seat and, simultaneously, unlocking the rear lock. The detachable seat is removably mounted to the automobile body by the seat detachment unit, and the seat tumbling unit both folds the seat back part of the detachable seat and tumbles the detachable seat.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
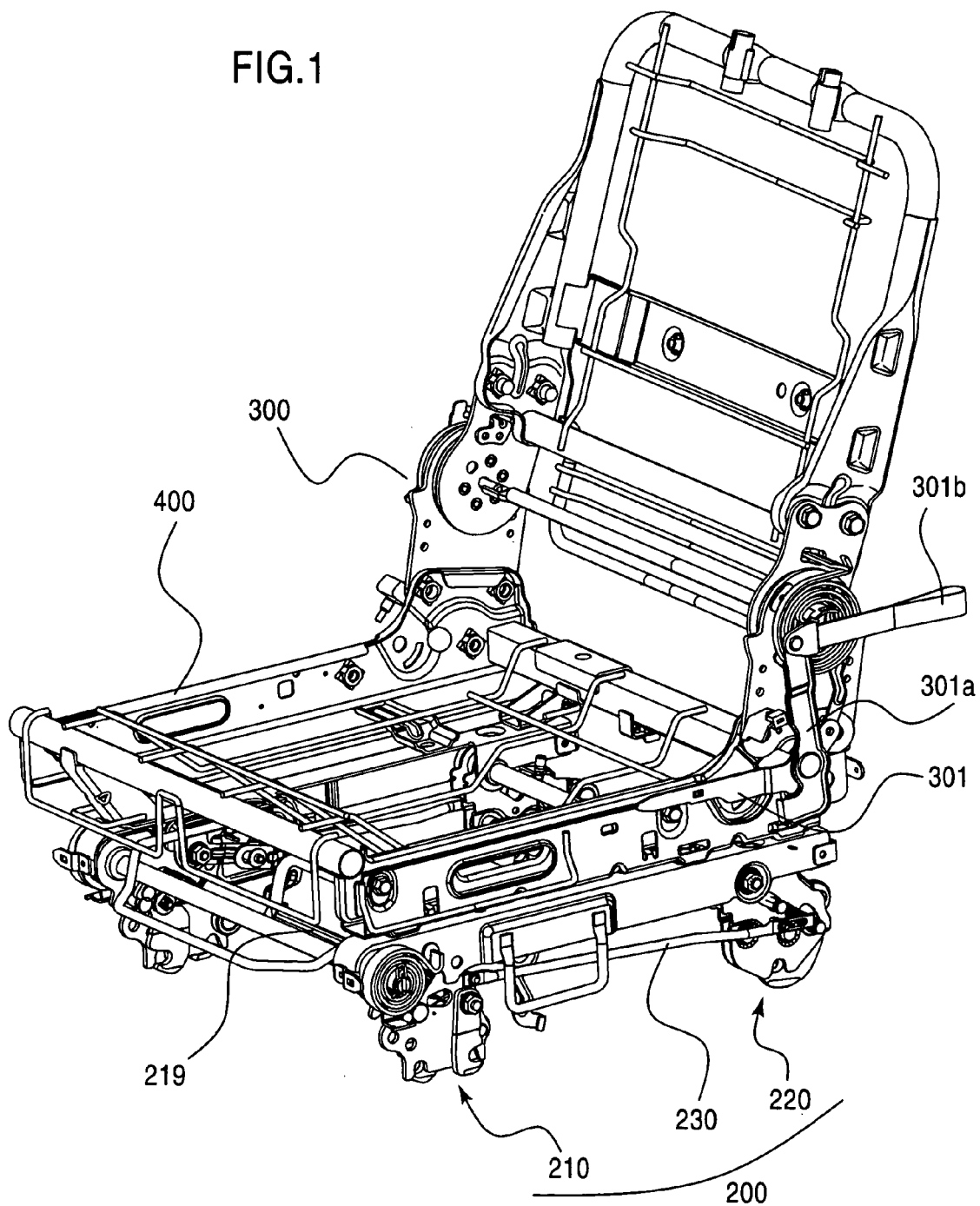
FIG. 1 is a perspective view showing a construction of a detachable seat for an automobile, according to an embodiment of the present invention.

Hereinafter, embodiments of the present invention will be described in detail with reference to the attached drawings.

Reference now should be made to the drawings, in which the same reference numerals are used throughout the different drawings to designate the same or similar components.

Figure 2:
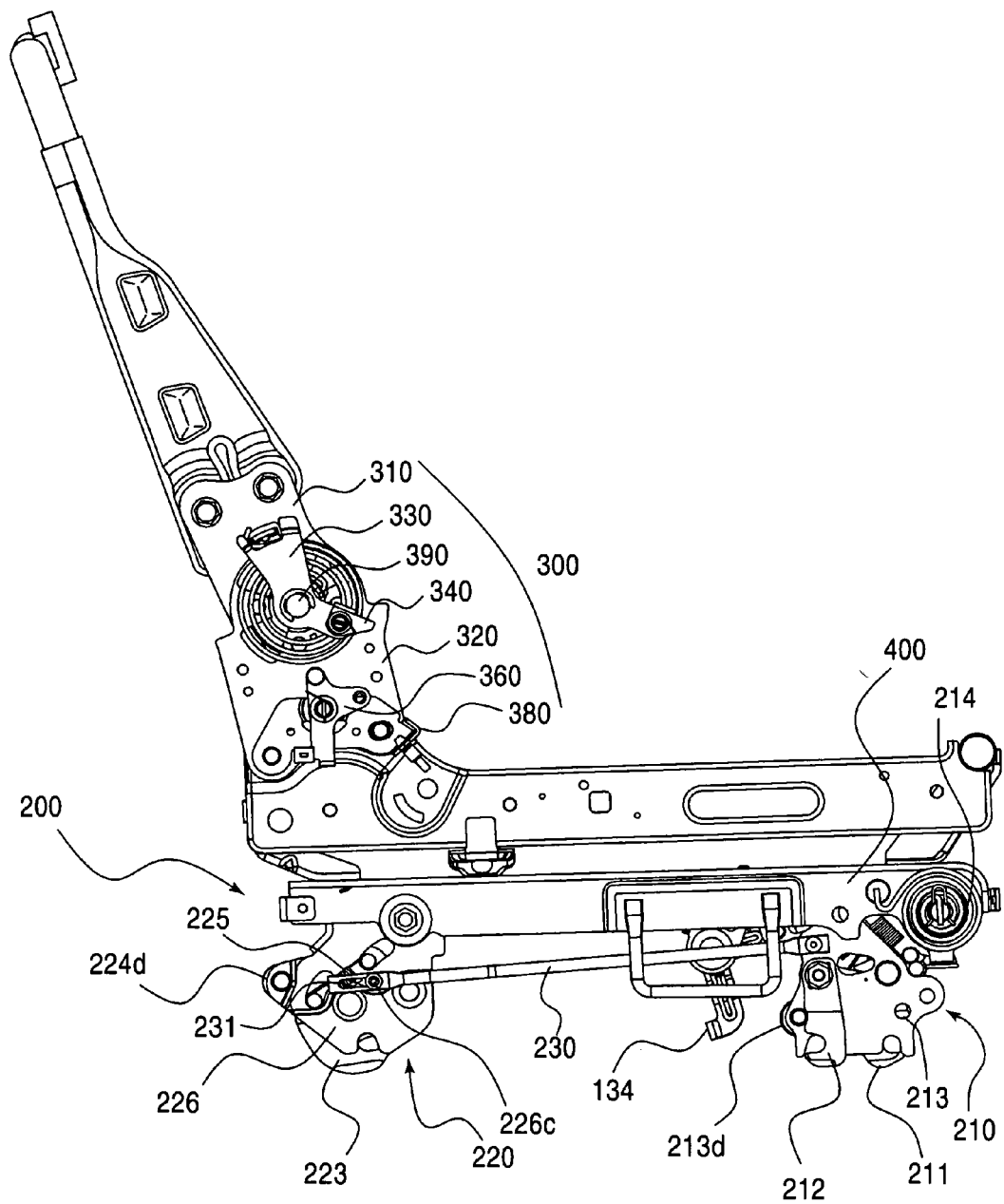
FIG. 2 is a view showing a side of the detachable seat of FIG. 1.
Figure 3:
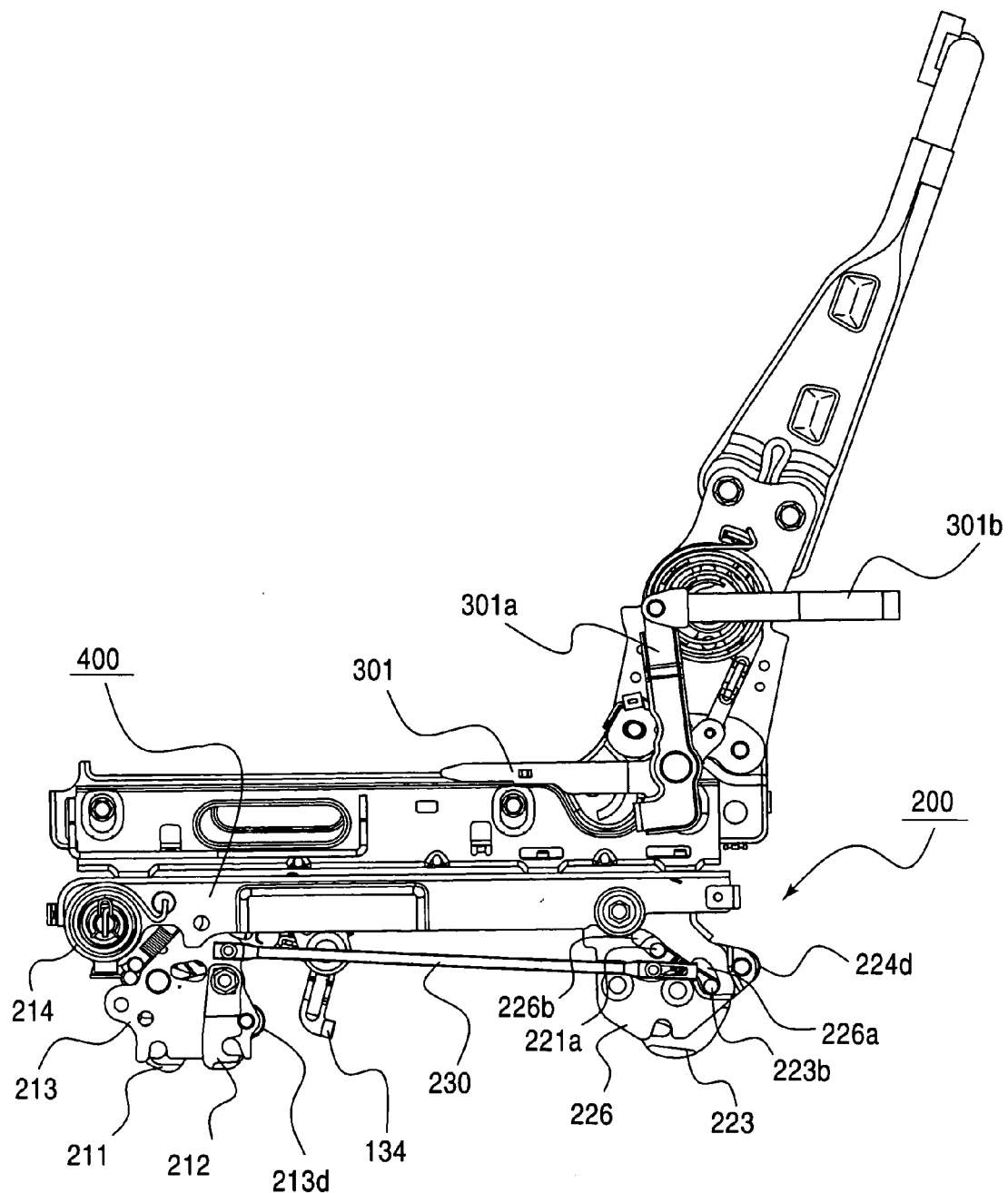
FIG. 3 is a view showing another side of the detachable seat of FIG. 1.
Figure 4:
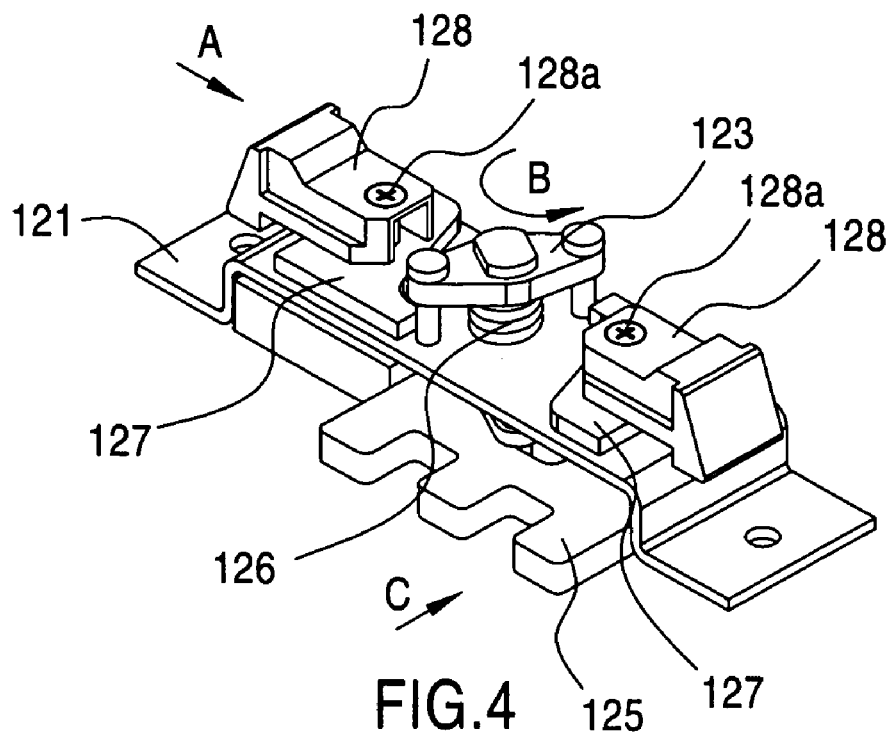
FIG. 4 is a perspective view of a locking unit of a seat slide unit on which the detachable seat of FIG. 1 is mounted.
Figure 5:
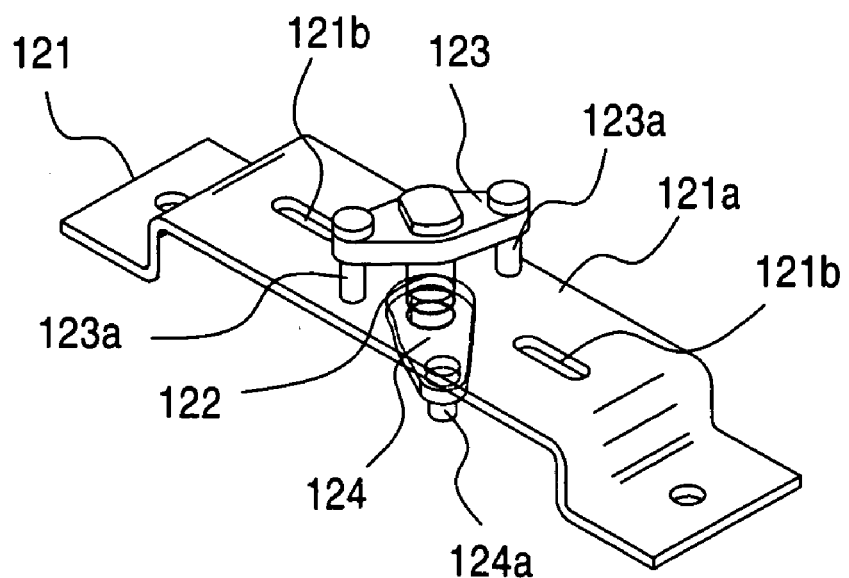
FIG. 5 is a perspective view showing a partial construction of the locking unit of FIG. 4.
Figure 6:
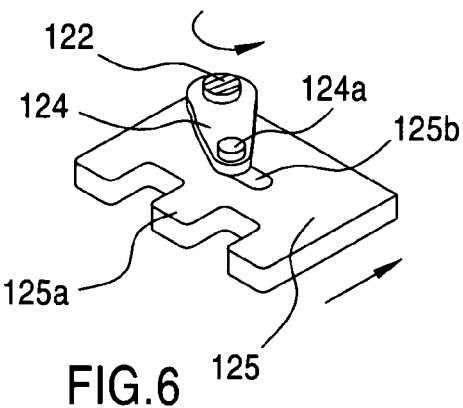
FIG. 6 is a perspective view showing an operation of a locking arm of the locking unit of FIG. 4.
Figure 7:
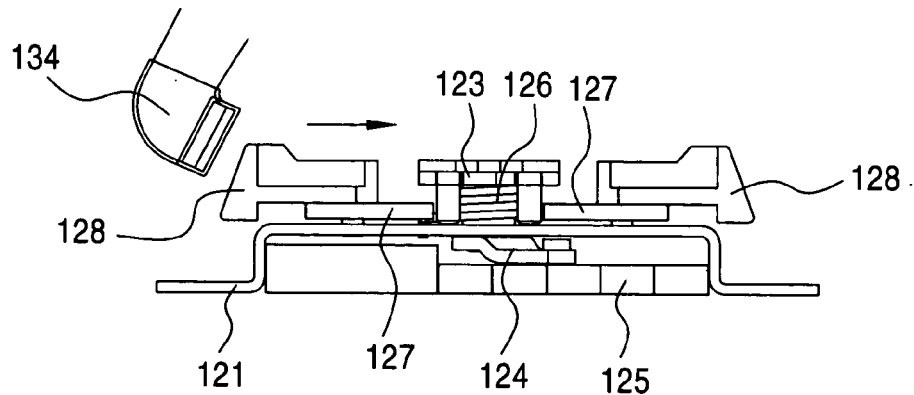
FIG. 7 is a sectional view showing an operation of the locking unit of FIG. 4.
Figure 8:
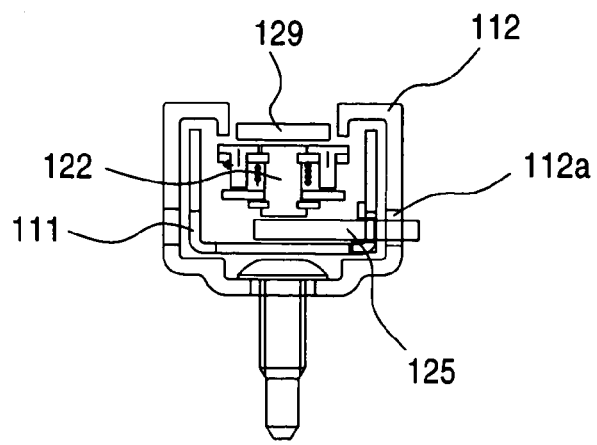
FIG. 8 is a sectional view showing a coupling of an inside long slide rail of the seat slide unit to an outside long slide rail of the seat slide unit on which the detachable seat of FIG. 1 is mounted.

FIG. 1 is a perspective view showing a construction of a detachable seat for an automobile, according to an embodiment of the present invention. FIG. 2 is a view showing a side of the detachable seat of FIG. 1. FIG. 3 is a view showing another side of the detachable seat of FIG. 1. As shown in FIGS. 1 through 3, the detachable seat of the present invention includes a seat slide unit 100 which is fastened along a central line of a lower end thereof to an automobile body. An inside long slide rail 111 and an outside long slide rail 112 are coupled together through a slide coupling structure. The detachable seat further includes a seat detachment unit 200. The seat detachment unit 200 has front and rear locks 210 and 220 which are coupled at predetermined positions to the inside long slide rail 111 of the seat slide unit 100 and rotatably mounted to a seat frame 400 of the detachable seat. The detachable seat further includes a seat tumbling unit 300 which is provided at a predetermined position on the detachable seat while being coupled to the rear lock 220 of the seat detachment unit 200. The seat tumbling unit 300 folds the detachable seat and, simultaneously, unlocks the rear lock 220. As such, the detachable seat of the present invention is easily mounted to the automobile body by the seat detachment unit 200. The seat tumbling unit 300 both folds a seat back part of the detachable seat and tumbles the detachable seat.

Figure 9:
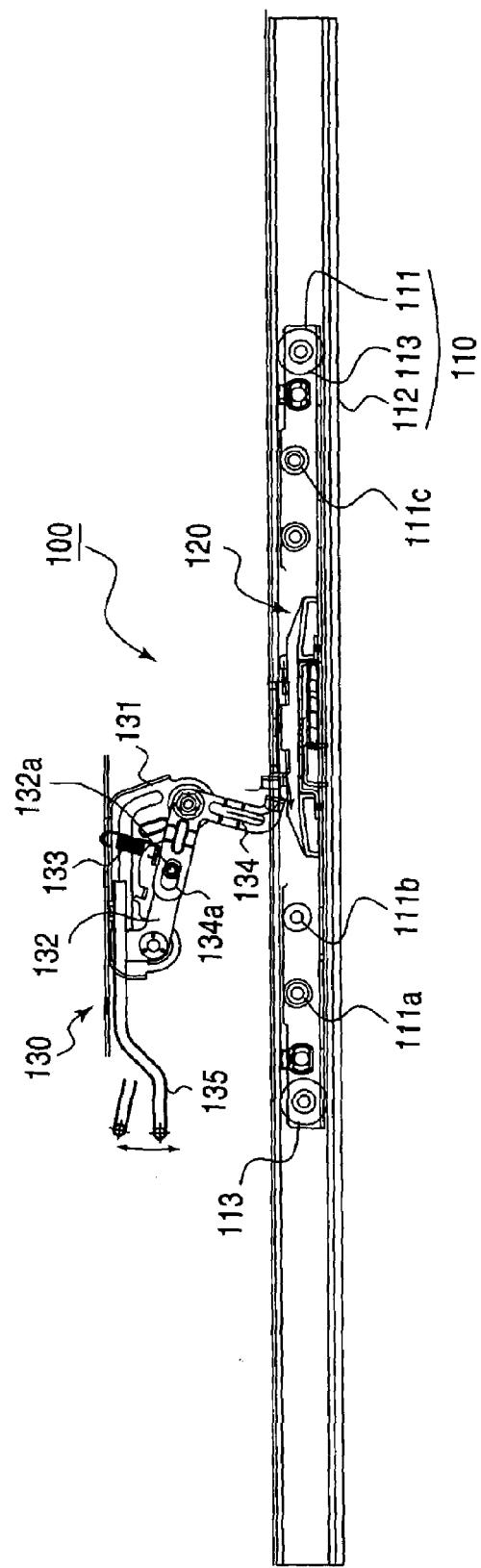
FIG. 9 is a view showing the construction of the seat slide unit on which the detachable seat of FIG. 1 is mounted.

FIG. 9 is a view showing the construction of the seat slide unit 100 on which the detachable seat of FIG. 1 is mounted. Referring to FIG. 9, the seat slide unit 100 includes a sliding unit 110 which is coupled to the automobile body, and a locking unit 120 which is provided in the sliding unit 110. The seat slide unit 100 further includes a power transmission unit 130 which is provided under a seat cushion part of the detachable seat to operate the locking unit 120.

The sliding unit 110 has the outside long slide rail 112 which is fastened along a central line of a lower end thereof to the automobile body by a fastening unit, such as a bolt or rivet. The sliding unit 110 further has the inside long slide rail 111 which is provided in the outside long slide rail 112 to slide along the outside long slide rail 112. A roller 113 is provided at each of the front and rear ends of the inside long slide rail 111 to be in close contact with an inner surface of the outside long slide rail 112. A plurality of strikers are provided at predetermined positions on the inside long slide rail 111 between the front and rear rollers 113 to be coupled to the seat detachment unit 200. The strikers comprise first and second strikers 111*a* and 111*b* which are provided on front portions of the inside long slide rail 111, and a third striker 111*c* which is provided on a rear portion of the inside long slide rail 111.

As shown in FIGS. 4 through 8, the locking unit 120 includes a base plate 121 which is fastened to the inside long slide rail 111, with a bent part 121*a* bent upwards at an intermediate portion of the base plate 121. A pair of guide slots 121*b* are provided along a longitudinal center on both ends of the bent part 121*a* to be symmetrical to each other. The locking unit 120 further includes a first actuating cam 123 which is provided on an upper end of a rotating shaft 122 passing through the bent part 121*a* of the base plate 120. The first actuating cam 123 rotates in conjunction with the rotating shaft 122. The locking unit 120 further includes a contact rod 123*a* which protrudes downwards from both ends of the first actuating cam 123, and a connecting arm 124 which is coupled to a lower end of the rotating shaft 122 at a first end thereof. An actuating rod 124*a* protrudes downwards from a second end of the connecting arm 124, so that the connecting arm 124 rotates along with the rotating shaft 122. The locking unit 120 further includes a locking arm 125 which is provided below the connecting arm 124, with an elongate hole 125*b* provided on the locking arm 125 to receive therein the actuating rod 124*a* of the connecting arm 124. The locking arm 125 moves horizontally by rotation of the connecting arm 124 in a space defined under the bent part 121*a* of the base plate 121. The locking unit 120 further includes an elastic unit 126 which is provided around the rotating shaft 122. The elastic unit 126 is coupled to the base plate 121 at a first end thereof while being coupled to the first actuating cam 123 at a second end thereof, so as to provide a restoring force to the rotating cam 123 while the rotating cam 123 rotates. The locking unit 120 further includes an actuating plate 127 which is provided around each of opposite sides of the first actuating cam 123 to slide horizontally on the base plate 121, thus actuating each of the contact rods 123*a* of the rotating cam 123. The locking unit 120 further includes an actuating block 128 which is provided on each of the actuating plates 127, and a locking bolt 128*a* which is tightened into each of the guide slots 121*b* of the base plate 121 after sequentially passing through the actuating block 128 and the actuating plate 127. The locking unit 120 further includes a cover 129 which is placed above the actuating blocks 128 while being fastened to the inside long slide rail 111, thus covering the locking unit 120. When drive power is transmitted from the power transmission unit 130 to the actuating block 128 to horizontally actuate the locking arm 125, the locking unit 120 unlocks the inside long slide rail 111 from the outside long slide rail 112.

The base plate 121 is fastened to the inside long slide rail 111 at both ends thereof. The bent part 121*a* is integrally bent upwards on the intermediate portion of the base plate 121 to define the predetermined space therein. The bent part 121a has a through hole in a center thereof. The guide slots 121b, which are aligned longitudinally on the bent part 121a, are provided on both sides of the through hole of the bent part 121a to be symmetrical to each other.

The rotating shaft 122 passes through the through hole formed on the bent part 121a of the base plate 121.

The first actuating cam 123 is provided on the upper end of the rotating shaft 122 to rotate along with the rotating shaft 122. The contact rods 123a protrude downwards from both ends of the first actuating cam 123 to be contact with the actuating plates 127. The elastic unit 126 comprising a torsion spring is provided between the first actuating cam 123 and the bent part 121a to provide the restoring force to the first actuating cam 123. The torsion spring 126 is fastened to the first actuating cam 123 at a first end thereof while being coupled to the base plate 121 at a second end thereof, thus providing restoring force to the rotating cam 123 while the rotating cam 123 rotates.

The connecting arm 124 is provided on the lower end of the rotating shaft 122 which protrudes downwards after passing through the bent part 121a, so that the connecting arm 124 rotates along with the rotating shaft 122. The actuating rod 124a protrudes downwards from the second end of the connecting arm 124.

The locking arm 125 is placed below the connecting arm 124. The locking arm 125 moves horizontally in the predetermined space defined by the bent part 121a. A plurality of insert protrusions 125a is provided on a side edge of the locking arm 125 to be removably inserted into a locking hole 112a of the outside long slide rail 112. The elongate hole 125b is provided at a predetermined position on the locking arm 125 to receive the actuating rod 124a of the connecting arm 124 therein. At this time, the elongate hole 125b has a predetermined length to allow the locking arm 125 to horizontally move to correspond to a change in the position of the actuating rod 124a by rotation of the connecting arm 124.

The actuating plate 127 is provided around each of the opposite sides of the first actuating cam 123 on the bent part 121a of the base plate 121. By operation of a lever 135 of the power transmission unit 130, the actuating plate 127 moves to the first actuating cam 123 to push the contact rod 123a of the first actuating cam 123. Thus, the first actuating cam 123 rotates in a predetermined direction. As such, the actuating plates 127 are provided around opposite sides of the first actuating cam 123. Therefore, even when the detachable seats of the present invention are mounted facing each other in the automobile, the locking units 120 of the detachable seats facing each other can execute the above-mentioned operation.

Each of the actuating blocks 128 is placed on each of the actuating plates 127. The actuating blocks 128 are fastened to the actuating plates 127 by the locking bolts 128a which are tightened into the guide slots 121b of the base plate 121 after sequentially passing through the actuating blocks 128 and the actuating plates 127. Furthermore, the actuating blocks 128 are supported by the cover 129. A part of each of the actuating blocks 128 is exposed to the outside, so that the actuating block 128 moves when the exposed part of the actuating block 128 is pushed by the power transmission unit 130.

As shown in FIG. 9, the power transmission unit 130 includes a fastening bracket 131 which is fastened to the seat frame 400, and a connecting block 132 which is rotatably provided on a front part of the fastening bracket 131 while being integrally coupled to the lever 135 at a first end thereof. A guide pin 132a protrudes from a second end of the connecting block 132. The power transmission unit 130 further includes a spring 133 which is coupled at a first end thereof to the second end of the connecting block 132 on which the guide pin 132a is provided. The spring 133 is coupled to the fastening bracket 131 at a second end thereof. The power transmission unit 130 further includes an actuating link 134 which is rotatably coupled to a rear part of the fastening bracket 131 at an intermediate portion thereof. The actuating link 134 is in contact with the actuating block 128 of the locking unit 120 at a first end thereof. A guide hole 134a is provided on a second end of the actuating link 134 to receive the guide pin 132a of the connecting block 132 therein.

In the power transmission unit 130, when the lever 135 is operated, the connecting block 132 rotates around a hinge shaft on the front part of the fastening bracket 131. By the rotation of the connecting block 132, the guide pin 132a of the connecting block 132 rotates downward. Then, the actuating link 134 rotates around a hinge shaft at the intermediate portion thereof while the guide hole 134a engages with the guide pin 132a. As a result, the first end of the actuating link 134 pushes the actuating block 128 of the locking unit 120 rearwards. When the lever 135 is released, the connecting block 132 is returned to the original position thereof by the spring 133. The lever 135 is also returned to the original position thereof.

Figure 10:
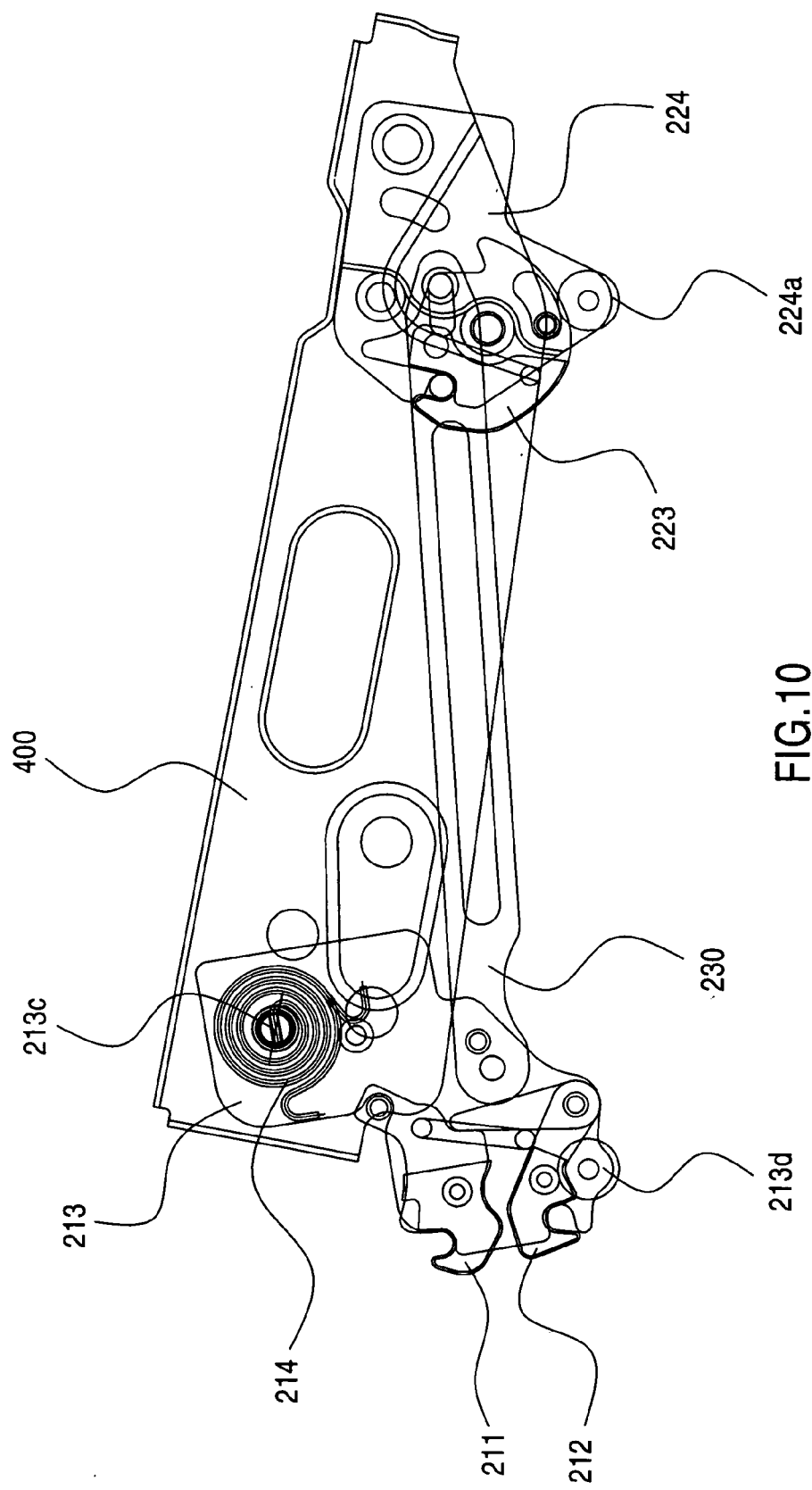
FIG. 10 is a view showing the construction of a seat detachment unit of the detachable seat of FIG. 1.
Figure 11:
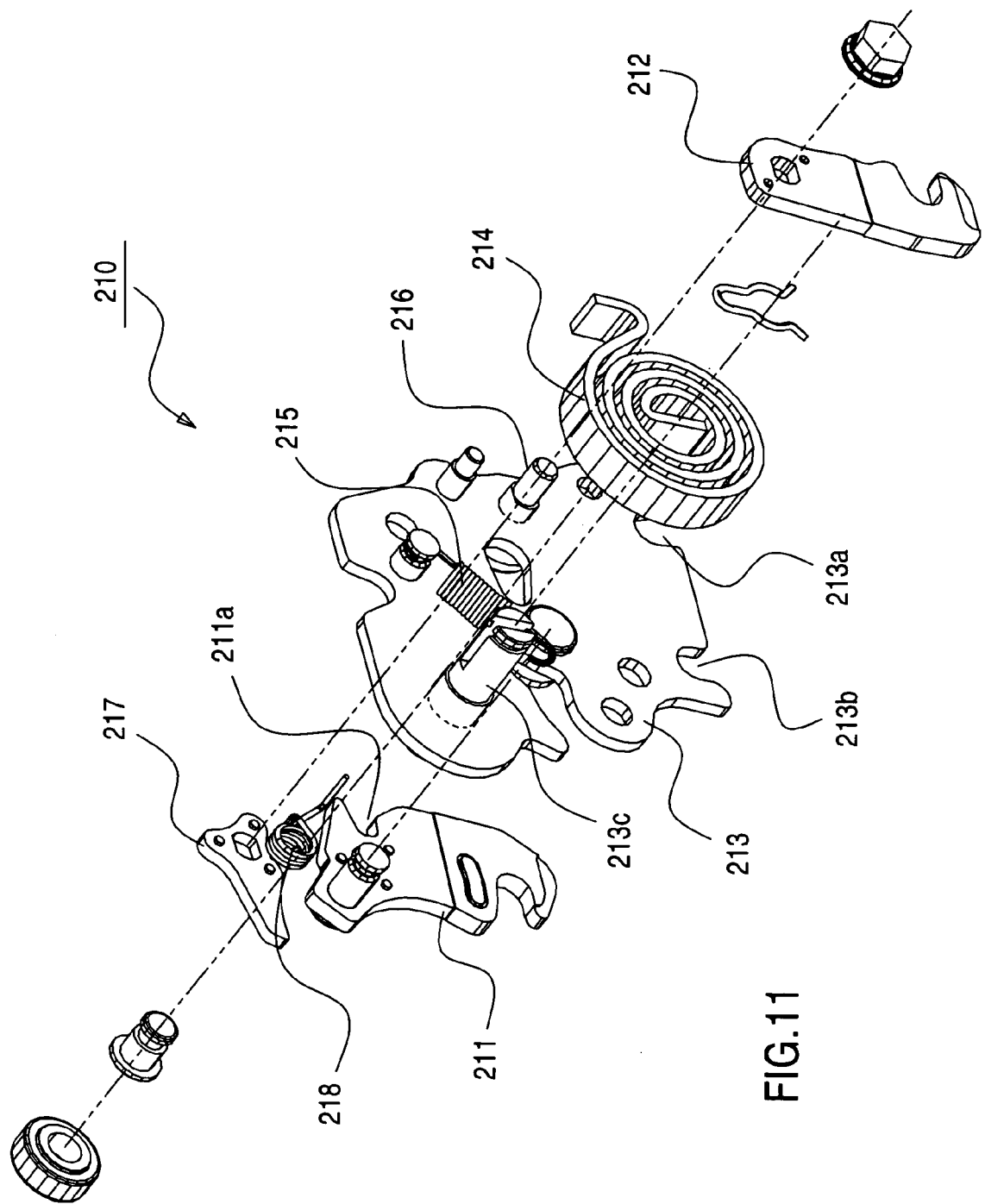
FIG. 11 is an exploded perspective view showing a front lock of the seat detachment unit of FIG. 10.
Figure 12:
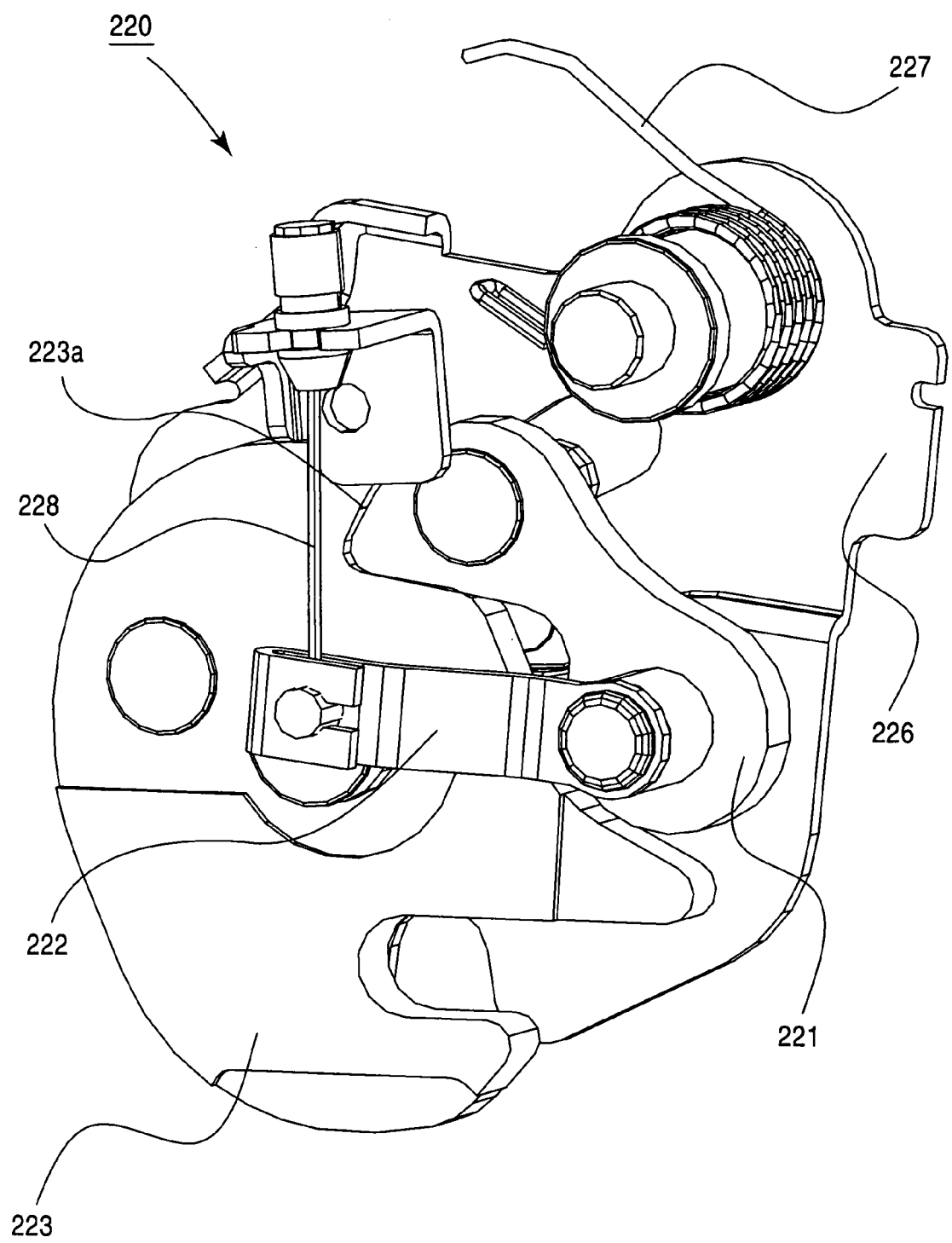
FIG. 12 is a perspective view of a rear lock of the seat detachment unit of FIG. 10, from which a first rear locking plate is removed.
Figure 13:
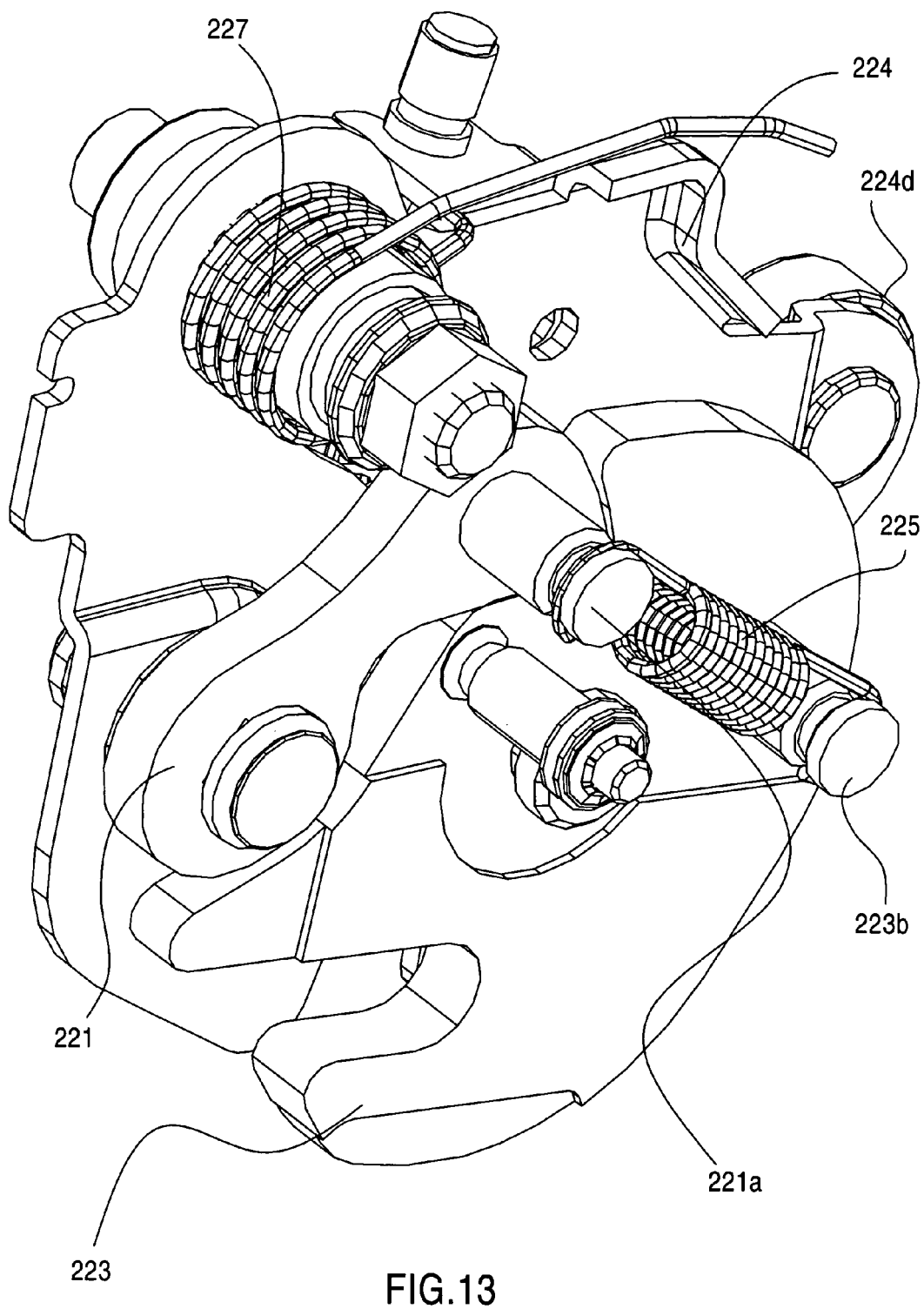
FIG. 13 is a perspective view of a rear lock of the seat detachment unit of FIG. 10, from which a second rear locking plate is removed.
Figure 14A:
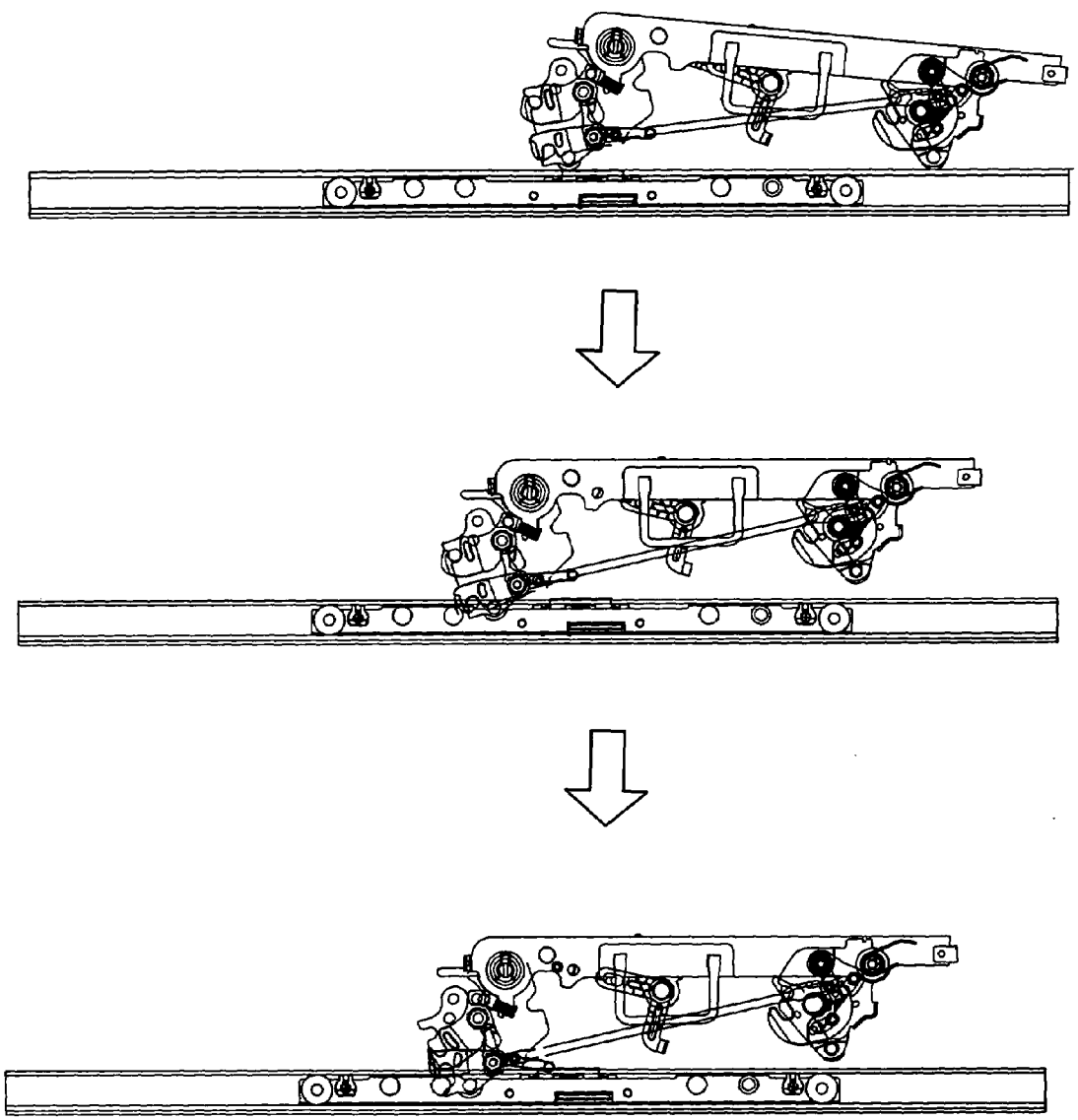
FIGS. 14*a* and 14*b* illustrate the operation of the seat detachment of FIG. 10 on the seat slide unit of FIG. 9.
Figure 14B:
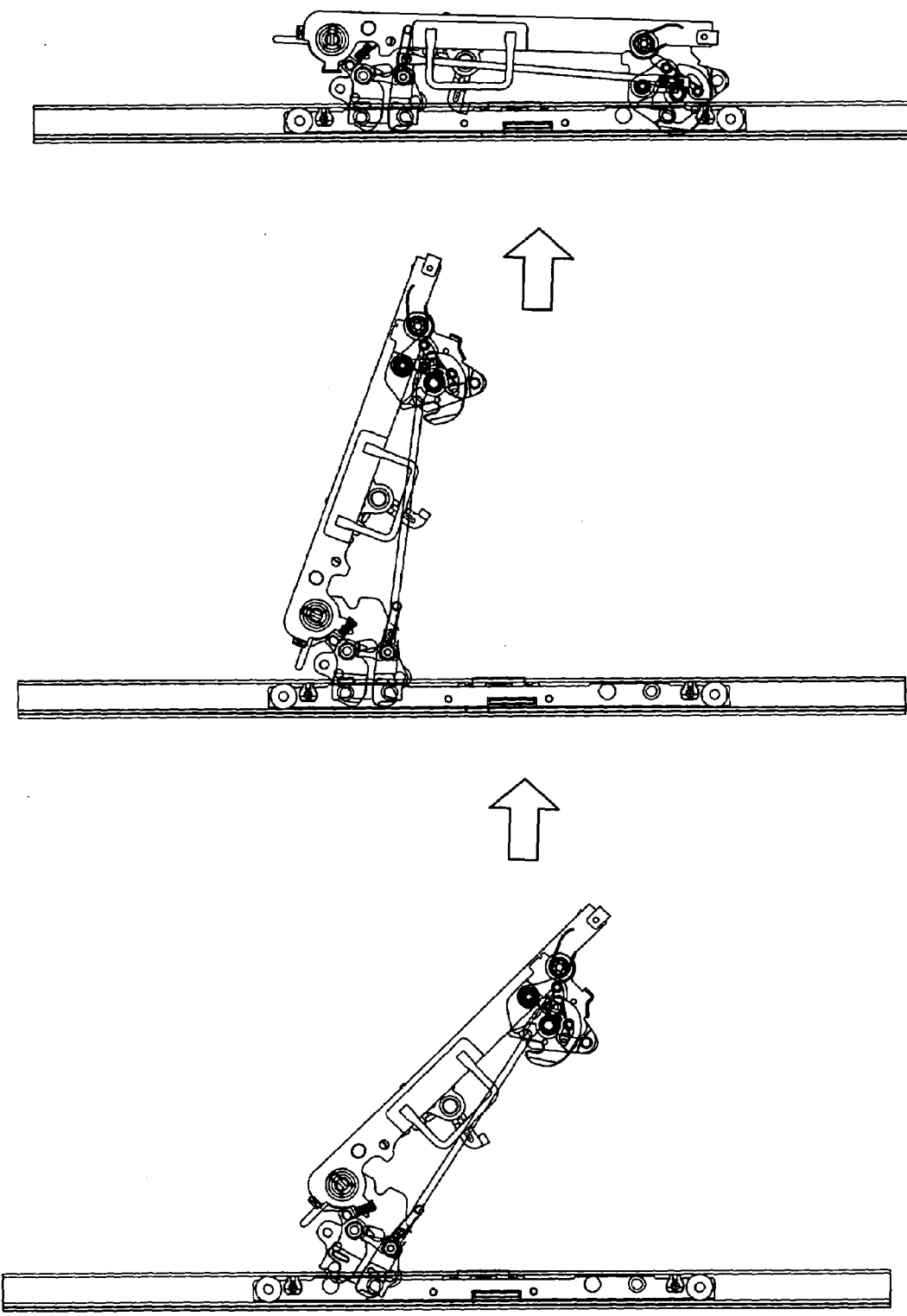

FIGS. 10 through 13 are views showing the construction of the seat detachment unit 200 of the detachable seat of FIG. 1. FIGS. 14a and 14b illustrate the operation of the seat detachment 200 of FIG. 10. As shown in FIG. 10, the seat detachment unit 200 is mounted to the seat frame 400 while being coupled to the seat slide unit 100. The seat detachment unit 200 includes the front lock 210 which is coupled to a lower portion of a front part of the seat frame 400, and the rear lock 220 which is coupled to a lower portion of a rear part of the seat frame 400 while being coupled to the seat tumbling unit 300 through a cable. The seat detachment unit 200 further includes a link unit 230 which is rotatably coupled to the front lock 210 at a first end thereof while being coupled to the rear lock 220 at a second end thereof.

The front lock 210, mounted to the lower portion of the front part of the seat frame 400, is coupled to the first and second strikers 111a and 111b which are provided on the front portion of the inside long slide rail 111 of the seat slide unit 100. Therefore, the front lock 210 fastens a front part of the detachable seat to the automobile body. As shown in FIGS. 11a and 11b, the front lock 210 includes a first hook 211 to be locked to the first striker 111a of the inside long slide rail 111, and a second hook 212 to be locked to the second striker 111b of the inside long slide rail 111. The front lock 210 further includes a front locking plate 213 which is placed between the first and second hooks 211 and 212. A protrusion 213c is provided at a predetermined upper position on the front locking plate 213 to pass through the seat frame 400. First and second locking notches 213a and 213b receive the first and second strikers 111a and 111b therein, respectively. A front roller 213d is provided at a predetermined position on the front locking plate 213. The front lock 210 further includes a spiral spring 214 which is fastened to the protrusion 213c of the front locking plate 213 at an inner end thereof while being fastened to the seat frame 400 at an outer end thereof. The front lock 210 further includes a first spring 215 which is coupled to the first hook 211 at a first end thereof and coupled to the front locking plate 213 at a second end thereof. The front lock 210 further includes an actuating arm 217 which is coupled to the second hook 212 by a coupling pin 216 passing through the front locking plate 213 to be integrally actuated together. The actuating arm 217 is inserted at an end thereof into an insert notch 211a provided on the first hook 211. The front lock 210 further includes a second spring 218 which is in close contact with an upper portion of the actuating arm 217 at an end thereof while being fastened to the front locking plate 213.

In the front lock 210 having the above-mentioned construction, the front locking plate 213 rotates around the protrusion 213c which passes through the seat frame 400 and is coupled to the spiral spring 214. Based on the front locking plate 213, both the second hook 212 and the first spring 215 are placed facing towards the outside of the detachable seat, and both the first hook 211 and the second spring 218 are placed facing towards the inside of the detachable seat. The first hook 211 is biased by the first spring 215 in a direction to be locked to the first striker 111a of the inside long slide rail 111. The second hook 212 is biased by the second spring 218 in a direction to be locked to the second striker 111b of the inside long slide rail 111. That is, the first and second hooks 211 and 212 are biased in opposite directions.

The detachable seat of the present invention further includes a release lever 219 which is integrally coupled to the first hook 211 to unlock the first hook 211 from the first striker 111a. That is, when a user pulls the release lever 219, the first hook 211 rotates in the direction to be released from the first striker 111a.

The second hook 212 is locked to the second striker 111b of the inside long slide rail 111 of the seat slide unit 100. The detachable seat rotates around the second hook 212, so that the first hook 211 is locked to the first striker 111a.

In a detailed description, the second hook 212 of the first lock 210 comes into contact with the second striker 111b by a force which pushes the detachable seat forwards. Due to the contact between the second hook 212 and the second striker 111b, the second hook 212 rotates the actuating arm 217 around the coupling pin 216. The actuating arm 217 rotates to compress the second spring 218. The second striker 111b is inserted into the second locking notch 213b of the front locking plate 213. At this time, the second hook 212 is returned by the second spring 218 to the original position thereof. As a result, the second hook 212 locks the second striker 111b in the second locking notch 213b of the front locking plate 213.

After the front locking plate 213 is coupled to the second striker 111b, the detachable seat is rotated forwards around the second striker 111b by the spiral spring 214. By the rotation of the detachable seat, the first hook 211 comes into contact with the first striker 111a. Thereafter, the first hook 211 rotates around a hinge, by which the first hook 211 is coupled to the front locking plate 213, so as to expand the first spring 215. After the first striker 111a is inserted into the first locking notch 213a of the front locking plate 213, the first hook 211 is returned to the original position thereof by the first spring 215. As a result, the first striker 111a is locked by the first hook 211 in the first locking notch 213a of the front locking plate 213.

To release the front lock 210 from the first and second strikers 111a and 111b, the release lever 219, coupled to the first hook 211, is operated. Then, the first hook 211 rotates and becomes unlocked from the first striker 111a. At this time, the insert notch 211a of the first hook 211 rotates along with the first hook 211. Thus, the actuating arm 217 rotates around the coupling pin 216. As a result, the second hook 212 rotates and becomes unlocked from the second striker 111b.

In the meantime, the rear lock 220 is mounted to the lower portion of the rear part of the seat frame 400. The rear lock 220 is coupled to the third striker 111c of the seat slide unit 100 to lock the rear part of the seat frame 400 to the automobile body. As shown in FIGS. 12 and 13, the rear lock 220 includes a third hook 223 to be locked to the third striker 111c of the inside long slide rail 111, with a stop notch 223a provided at a predetermined position on the third hook 223. The rear lock 220 further includes a first rear locking plate 224 which is rotatably mounted to the seat frame 400 while the third hook 223 is mounted at a predetermined position thereof on the first rear locking plate 224 by a hinge, with a rear roller 224d provided at a predetermined position on the first rear locking plate 224. The rear lock 220 further includes a first stopper 221 which is mounted at a predetermined position on the first rear locking plate 224 by a hinge. The first stopper 221 is inserted into a stop notch 223a of the third hook 223 at an end thereof. The rear lock 220 further includes a second rear locking plate 226. The second rear locking plate 226 includes a second stopper 222 which is coupled to the seat tumbling unit 300 and has the same rotating shaft as the first stopper 221 to be operated together. The second rear locking plate 226 further includes a first guide hole 226a to receive a protrusion 221a of the third hook 223 therein, and a second guide hole 226b to receive a protrusion 221a of the first stopper 221 therein. The rear lock 220 further includes a spring 225 which is coupled at a first end thereof to an end of the protrusion 223b of the third hook 223 passing through the first guide hole 226a of the second rear locking plate 226, and coupled at a second end thereof to an end of the protrusion 221a of the first stopper 221 passing through the second guide hole 226b of the second rear locking plate 226.

The first stopper 221 and the third hook 223 are placed between the first and second rear locking plates 224 and 226. Based on both the first stopper 221 and the third hook 223, the second stopper 222 is placed facing towards the outside of the detachable seat where the first rear locking plate 224 is placed. The spring 225 is placed facing towards the inside of the detachable seat where the second rear locking plate 226 is placed. Furthermore, the first and second stoppers 221 and 222 rotate around the same rotating shaft.

In the rear lock 220 having the above-mentioned construction, when the second stopper 222 rotates around the hinge by the seat tumbling unit 300, the first stopper 221 also rotates in a predetermined direction. Then, the end of the first stopper 221 is removed from the stop notch 223a of the third hook 223 and, simultaneously, the third hook 223 rotates in a predetermined direction due to the spring 225 according to the rotation of the first stopper 221. As a result, the third hook 223 is unlocked from the third striker 111c.

When the third hook 223 is unlocked from the third striker 11c, the rear part of the seat frame 400 is released from the seat slide unit 100. Then, the seat frame 400 is rotated by the spiral spring 214 of the front lock 210 around the protrusion 213c of the front locking plate 213. Thus, the detachable seat is tumbled.

Furthermore, the rear lock 220 further includes a restoring spring 227 which is provided at a predetermined position on the first rear locking plate 224 which is coupled to the seat frame 400 by a hinge.

In the meantime, the first and second ends of the link unit 230 are coupled to the front and rear locks 210 and 220, respectively, such that the front and rear locks 210 and 220 are operated in conjunction with each other. In detail, the first end of the link unit 230 is coupled to the front locking plate 213 of the front lock 210 by a hinge while a guide protrusion 226c, provided on the second rear locking plate 226, engages with an elongate hole 231 provided on the second end of the link unit 230. The link unit 230 couples the rear lock 220 to the front lock 210 so that the rear lock 220 is operated to respond to the rotation of the front lock 210 by the spiral spring 214. The link unit 230 allows the front and rear rollers 213d and 224d of the front and first rear locking plates 213 and 224 to be in smooth contact with a floor surface of the automobile body. Furthermore, the link unit 230 allows the locking operations of the first, second and third hooks 211, 212 and 213 to be smoothly executed.

Figure 15:
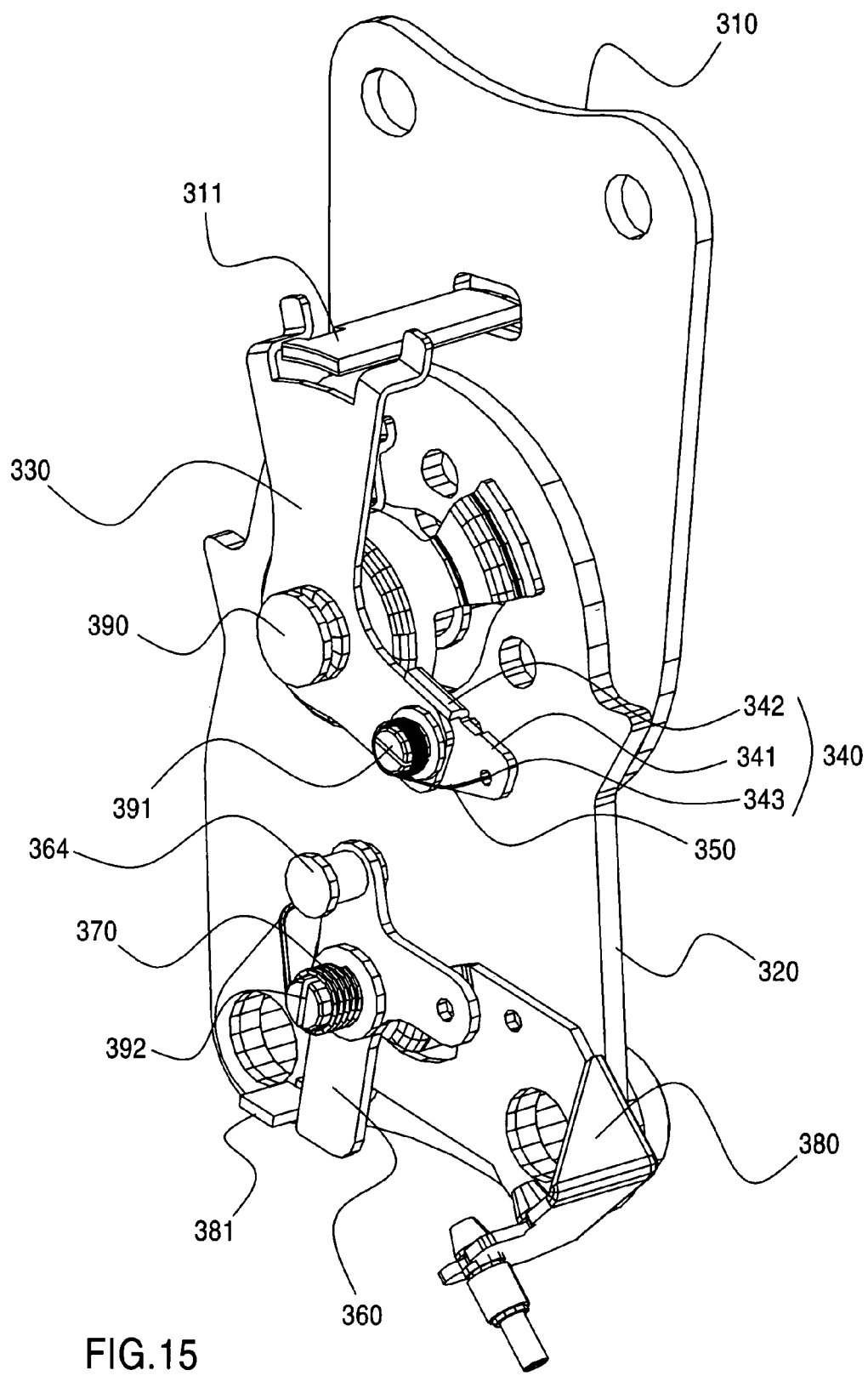
FIG. 15 is a perspective view of a seat tumbling unit of the detachable seat of FIG. 1.
Figure 16:
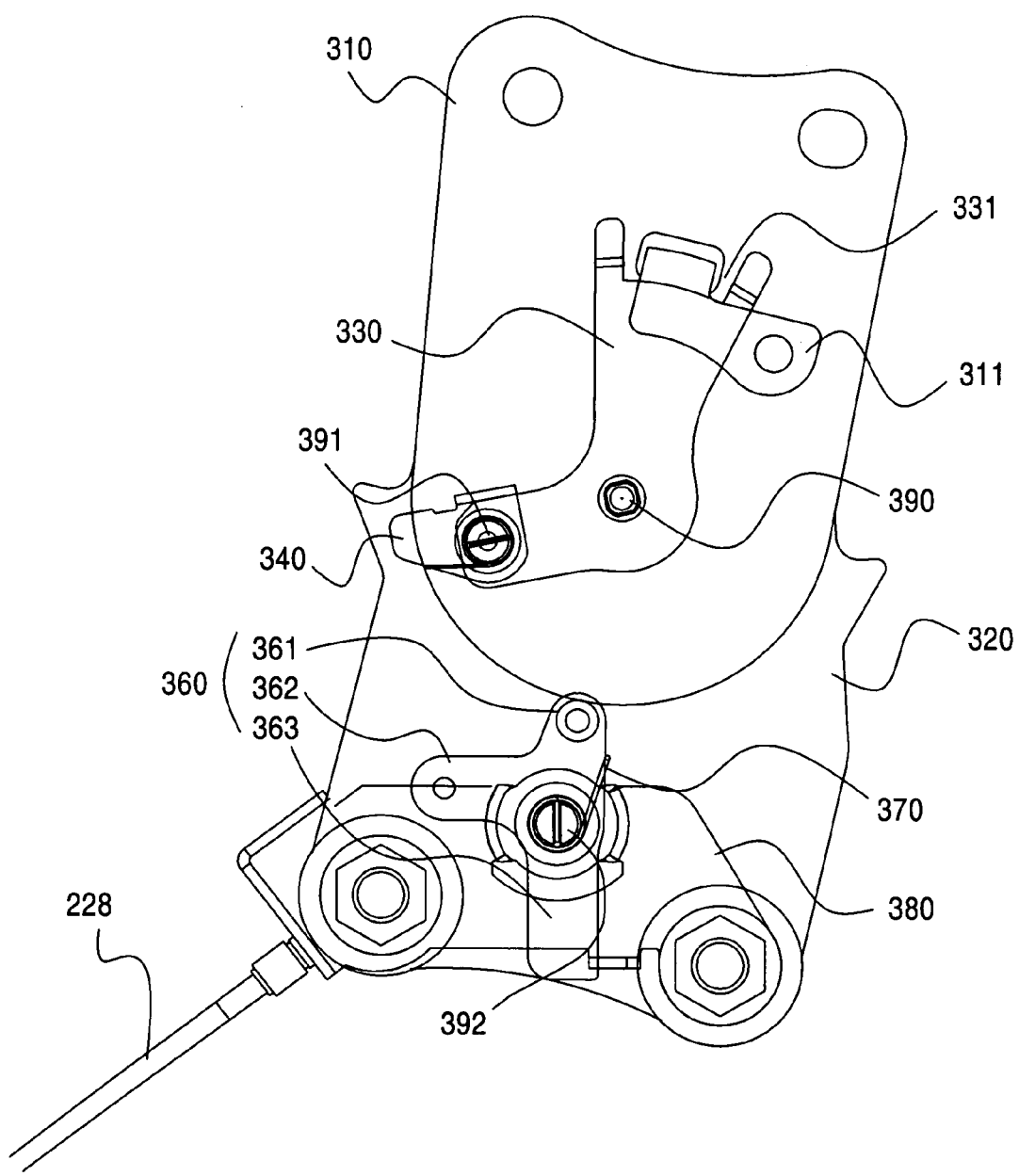
FIG. 16 is a front view of the seat tumbling unit of FIG. 15.
Figure 17:
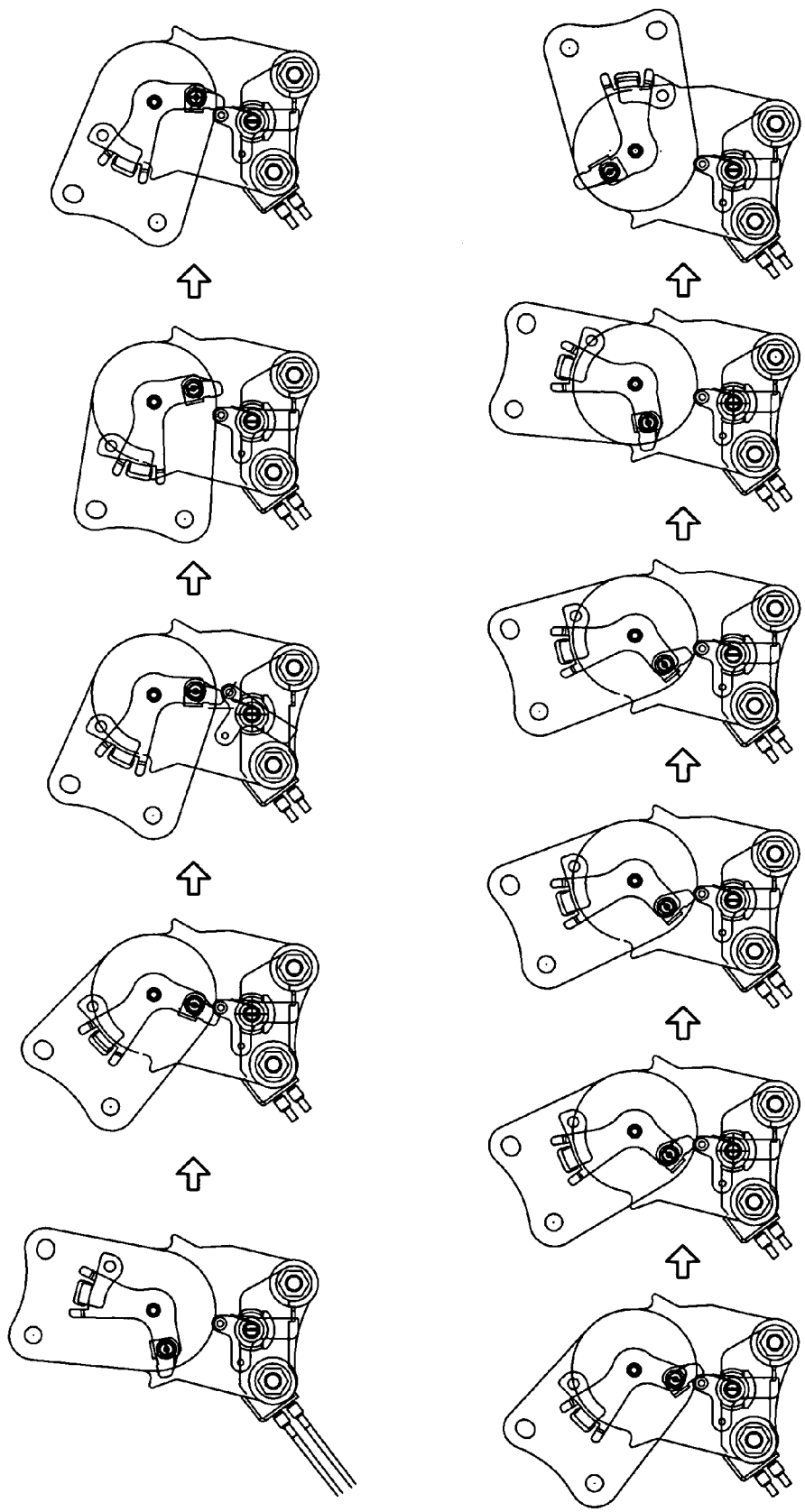
FIG. 17 illustrates the operation of the seat tumbling unit of FIG. 15.

The seat tumbling unit 300 folds the seat back part of the detachable seat and, simultaneously, unlocks the rear lock 220 of the seat detachment unit 200 from the seat slide unit 100, thus tumbling the detachable seat. As shown in FIGS. 15 through 17, the seat back part is unlocked by operation of a folding lever 301. By a second actuating cam 340 integrally operated along with the seat back part, the rear lock 220 is unlocked from the automobile body to separate a rear part of a seat cushion part of the detachable seat from the automobile body. When the second actuating cam 340 is operated over the operation range thereof during the folding of the seat back part, the seat cushion part is separately locked to the automobile body. The structure for unlocking the seat back part from the automobile body using the folding lever is well-known to those skilled in this art, thus further explanation is deemed unnecessary.

In detail, the seat tumbling unit 300 includes a seat back bracket 310 which is integrally provided at a predetermined position on a sidewall of the seat back part of the detachable seat, and a seat cushion bracket 320 which is integrally provided at a predetermined position on the seat cushion part while being coupled to the seat back bracket 310 by a main hinge shaft 390. The seat tumbling unit 300 further includes a sub-rotor 330 which has an L-shaped appearance and is coupled to the main hinge shaft 390 at an intermediate portion thereof while being integrally coupled to the seat back bracket 310 at an upper end thereof. The seat tumbling unit 300 further includes the second actuating cam 340 which is coupled to a lower end of the sub-rotor 330 by a hinge shaft 391, and an elastic spring 350 which is provided around the hinge shaft 391 coupling the second actuating cam 340 to the sub-rotor 330. The elastic spring 350 is coupled to the sub-rotor 330 at a first end thereof while being coupled to the second actuating cam 340 at a second end thereof. The seat tumbling unit 300 further includes an actuating lever 360 which has a T-shaped appearance and is provided at an intermediate portion thereof on a lower end of the seat cushion bracket 320 by the hinge shaft 392 to rotate in a predetermined direction. The actuating lever 360 is coupled to the cable 228 of the rear lock 220. The seat tumbling unit 300 further includes an actuating spring 370 which is provided around the hinge shaft 392 of the actuating lever 360, so that the actuating spring 370 is coupled to the hinge shaft 392 of the actuating lever 360 at a first end thereof and is coupled to a predetermined position of the actuating lever 360 at a second end thereof. The seat tumbling unit 300 further includes a cable bracket 380 which is integrally provided on the lower end of the seat cushion bracket 320 to guide and support the cable 228 of the rear lock 220 thereon, with a stop protrusion 381 provided at a predetermined position on the cable bracket 380 to be in contact with an end of the actuating lever 360.

The seat back bracket 310 is integrally coupled to the seat back frame of the seat back part. The sub-rotor 330 is coupled to the seat back bracket 310 by a connecting bracket 311.

The seat cushion bracket 320 is coupled at a lower part thereof to a seat cushion frame of the seat cushion part by a locking bolt. The cable bracket 380, which guides and supports the cable 228 of the rear lock 220 thereon, is integrally mounted to the seat cushion bracket 320 coupled to the seat cushion frame.

The sub-rotor 330 is rotatably mounted at the intermediate portion thereof to the main hinge shaft 390 which couples the seat cushion bracket 320 to the seat back bracket 310. An insert part 331 is provided on an upper end of the sub-rotor 330. The connecting bracket 311 of the seat back bracket 310 is placed in the insert part 331. The second actuating cam 340 is coupled to the lower end of the sub-rotor 330 by the hinge shaft 391. When the seat back bracket 310 rotates in a predetermined direction, the sub-rotor 330 having the L-shaped appearance rotates around the main hinge shaft 390 in the same direction as that of the seat back bracket 310 due to the connecting bracket 311 inserted in the insert part 331 of the upper end of the sub-rotor 330.

As such, the seat back bracket 310, the seat cushion bracket 320 and the sub-rotor 330 are sequentially coupled to the seat back part of the detachable seat by the main hinge shaft 390.

The second actuating cam 340 includes a contact part 341 which is coupled to the sub-rotor 330 by the hinge shaft 391 to be in contact with the actuating lever 360 at an end of the contact part 343. A spring insert hole 343 is provided on the contact part 341 to receive the elastic spring 350 therein. The second actuating cam 340 further includes a support protrusion 342 which is perpendicular to the contact part 341 to be in contact with a side edge of the sub-rotor 330. That is, the second actuating cam 340 has a reversed L-shaped cross-section at a portion at which the section actuating cam 340 is in contact with the sub-rotor 330, such that the support protrusion 342 is perpendicular to the contact part 341.

The elastic spring 350 returns the second actuating cam 340 to the original position thereof. The elastic spring 350 is provided around the hinge shaft 391 which couples the second actuating cam 340 to the sub-rotor 330. The elastic spring 350 is inserted into the spring insert hole 343 of the second actuating cam 340 at the first end thereof while being coupled to the sub-rotor 330 at the second end thereof. Thus, the elastic spring 350 rotates the second actuating cam 340 around the hinge shaft 392 upwards, that is, toward where the connecting bracket 311 is inserted into the insert part 331 of the sub-rotor 330.

In other words, the second actuating cam 340 is biased upwards by the elastic spring 350. The rotation of the second actuating cam 340 is limited by the support protrusion 342 which comes into contact with the sub-rotor 330. That is, the second actuating cam 340 rotates upwards until the support protrusion 342 comes into contact with the sub-rotor 330. As such, due to the support protrusion 342, when the second actuating cam 340 is affected by an outside force, the second actuating cam 340 rotates in the direction which compresses the elastic spring 350.

The actuating lever 360 rotates in one direction while being in contact with the second actuating cam 340. The actuating lever 360 is coupled to the cable 228 of the rear lock 220 at an end thereof. The actuating lever 360 includes a first part 361 to be in contact with the second actuating cam 340, and a second part 362 which is coupled to the cable 288 of the rear lock 220. The actuating lever 360 further includes a third part 363 to be in contact with the cable bracket 380 which is integrally provided on the seat cushion bracket 320. The first, second and third parts 361, 362 and 363 are integrally arranged at right angular intervals. A junction part among the first, second and third parts 361, 362 and 363 is coupled to the seat cushion bracket 320 by the hinge shaft 392. A contact protrusion 364 is provided on the first part 361 to be in contact with the second actuating cam 340. The actuating lever 360 of the above-mentioned structure has a T-shaped appearance.

The actuating spring 370 operates the actuating lever 360 and is provided around the hinge shaft 392 of the actuating lever 360. The actuating spring 370 is integrally coupled to the hinge shaft 392 of the actuating lever 360 at the first end thereof while being in close contact with a side edge of the first part 361 at a second end thereof.

The stop protrusion 381 is provided at the predetermined position on the cable bracket 380 to be in contact with the third part 363 of the actuating lever 360. The stop protrusion 381 serves to limit the rotation of the actuating lever 360.

The actuating lever 360 rotates by the actuating spring 370 in a direction such that the first part 361 rotates to the position of the second part 362. The rotation of the actuating lever 360 is limited by the contact between the third part 363 and the stop protrusion 381 of the cable bracket 380. In detail, due to the contact between the third part 363 and the stop protrusion 381, when the actuating lever 360 is affected by an outside force, the actuating lever 360 rotates in one direction such that the second part 362 rotates to the position of the first part 361. When the outside force is removed from the actuating lever 360, the actuating lever 360 is rotated by the actuating spring 370 in the reverse direction such that the first part 361 rotates to the position of the second part 362. Thus, the actuating lever 360 is returned to the original position thereof.

In the meantime, a rear bracket 301a is coupled to the folding lever 301. A rear handle 302b is coupled to the rear bracket 301a to protrude rearwards from the seat back part. When the rear handle 302b, coupled to the rear bracket 301a, is pulled rearwards, a reclining lever of a reclining unit is operated. Thus, the seat back part is folded toward the seat cushion part and, simultaneously, the detachable seat is tumbled.

In the seat tumbling unit 300 having the above-mentioned structure, when the seat back part is folded forwards, both the seat back bracket 310 and the sub-rotor 330, which are coupled together by the connecting bracket 311, integrally rotate around the main hinge shaft 390 in a predetermined direction. While the sub-rotor 330 rotates, the second actuating cam 340 comes into contact with the contact protrusion 364 of the first part 361 of the actuating lever 360. Thus, the actuating lever 360 is rotated around the hinge shaft 392 in the direction such that the second part 362 rotates to the position of the first part 361. At this time, because the support protrusion 342 of the second actuating cam 340 is in contact with the side edge of the sub-rotor 330, the second actuating cam 340 does not rotate around the hinge shaft 391.

By the above-mentioned rotation of the actuating lever 360, the cable 288 of the rear lock 220, coupled to the second part 362 of the actuating lever 360, is pulled. When the cable 288 is pulled, both the first and second stoppers 221 and 222 rotate. At this time, the spring 255 coupled to the first stopper 221 pulls the third hook 223. Therefore, the third hook 223 is unlocked from the third striker 111c of the seat slide unit 100. Thus, the first and second rear locking plates 224 and 226 are released from the striker 111c. As such, when the first and second rear locking plates 224 and 226 are released from the striker 11c, the seat frame 400 is tumbled around the front locking plate 213 by the spiral spring 214.

If it is desired to use the detachable seat as a table without tumbling the seat, the rear part of the seat cushion part, to which the rear lock 220 is coupled, is pushed downwards, that is, toward the automobile body in the state in which the rear lock 220 is unlocked from the third striker 111c. Then, the third hook 223 of the rear lock 220 comes into close contact with the third striker 111c and, thus, rotates around a hinge shaft. As a result, the third striker 111c is inserted into locking notches of the first and second rear locking plates 224 and 226 and, simultaneously, the end of the first stopper 221 is inserted into the stop notch 223a of the third hook 223 by the spring 225. Thus, the rear lock 220 is locked to the automobile body.

To return the seat back part to the original position thereof, the seat back part is rotated rearwards around the main hinge shaft 390. Then, the sub-rotor 330 rotates along with the seat back bracket 310 and, thus, the second actuating cam 340 comes into contact with the contact protrusion 364 of the first part 361 of the actuating lever 360. By the contact between the second actuating cam 340 and the contact protrusion 364, the second actuating cam 340 rotates around the hinge shaft 391 in the predetermined direction to compress the elastic spring 350. At this time, because the third part 363 of the actuating lever 360 is in contact with the stop protrusion 381 of the cable bracket 380, the third part 363 of the actuating lever 360 does not rotate. Accordingly, the actuating lever 360 does not affect the cable 288 of the rear lock 220.

When the sub-rotor 330 rotates further, the second actuating cam 340 is free from the contact protrusion 364 of the first part 361 of the actuating lever 360. Then, the second actuating cam 340 is rotated by the elastic spring 350 to the original position thereof, that is, toward the insert part 331 of the sub-rotor 330. As a result, the second actuating cam 340 is returned to the original position thereof, so that the detachable seat is returned to the original state to allow the user to sit on the detachable seat.

In the meantime, in the case that the detachable seat of the present invention is detached from the automobile body, the front lock 210 is rotated by the spiral spring 214 around the protrusion 213c of the front lock 210. Then, the front roller 213d of the front lock 210 is placed at the lowermost position. Furthermore, the rotation of the front lock 210 is passed to the rear lock 220 through the link unit 230, so that the rear roller 224d is also placed at the lowermost position. Therefore, the front and rear rollers 213d and 224d of the front and rear locks 210 and 220 comes into close contact with the floor surface of the automobile body. Thus, the detachable seat can be readily moved to a desired position.

To mount the detachable seat to the automobile body, the front roller 213d of the front lock 210 is inserted into the outside long slide rail 112 of the seat slide unit 100. Thereafter, the detachable seat is pushed forwards while the front roller 213d engages with the outside long slide rail 112. By the force pushing the detachable seat forwards, the second hook 212 of the front lock 210 is coupled to the second striker 111b of the seat slide unit 100, and the first hook 211 of the front lock 210 is coupled to the first striker 111a of the seat slide unit 100. As such, after the front lock 210 is locked to the front part of the seat slide unit 100, the rear portion of the seat cushion part is pushed toward the floor surface of the automobile body. Then, the detachable seat rotates around the front lock 210 downwards, so that the third hook 223 of the rear lock 220 is coupled to the third striker 111c of the seat slide unit 100. Thus, the detachable seat is locked to the automobile body.

In the meantime, if the seat back part is folded to the seat cushion part by the seat tumbling unit, the third hook 223 is decoupled from the third striker 111c to unlock the rear lock 220 from the seat slide unit 100. Then, the detachable seat rotates around the front lock 210 by the spiral spring 214 so that the detachable seat of the present invention is tumbled.

As described above, the present invention provides a detachable seat which is removably mounted to an automobile body to obtain sufficient space for loading baggage in the automobile, and in which a plurality of rollers allow the detachable seat to be readily moved and removably mounted to the automobile body, and which can be tumbled through a single operation, thus being convenient to a user.

Furthermore, in the present invention, an outside long slide rail of a seat slide unit is fastened along a central line of a lower end thereof to the automobile body using a fastening unit without a separate mounting bracket. Therefore, the seat slide unit can be easily mounted even in a narrow indoor space, thus efficiently using the indoor space, and ensuring a good appearance of the inside of the automobile.

In addition, in the present invention, an inside long slide rail and the outside long slide rail of the seat slide unit are coupled together through a slide coupling structure. Therefore, a locking unit satisfies the trend of smallness. As well, the detachable seat can be firmly mounted to the seat slide unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A detachable seat for automobiles, comprising:
    a seat slide unit adapted to be fastened to an automobile body along a central line of a lower end thereof, with both an inside long slide rail and an outside long slide rail coupled together through a slide coupling structure;
    a seat detachment unit, comprising: front and rear locks coupled at predetermined positions to the inside long slide rail of the seat slide unit and rotatably mounted to a seat frame of the detachable seat, so that the front and rear locks are simultaneously rotated; and
    a seat tumbling unit provided at a predetermined position on the detachable seat while being coupled to the rear lock of the seat detachment unit,
    a sliding unit, comprising
        the outside long slide rail adapted to be fastened to the automobile body along a central line of a lower end thereof by a fastening unit; and
        the inside long slide rail provided in the outside long slide rail to slide along the outside long slide rail, with first, second and third strikers provided on the inside long slide rail to be coupled to the seat detachment unit; and
    a locking unit provided in the sliding unit to horizontally operate to maintain both the outside long slide rail and the inside long slide rail at predetermined positions; and
    a power transmission unit provided under a seat cushion part of the detachable seat while being coupled to the locking unit,
    wherein the seat tumbling unit includes a plurality of operably connected parts configured to simultaneously fold the detachable seat and unlock the rear lock, and
    wherein the detachable seat is adapted to be removably mounted to the automobile body by the seat detachment unit, and the seat tumbling unit both folds a seat back part of the detachable seat and tumbles the detachable seat.

2. The detachable seat according to claim 1, wherein the locking unit comprises:
    a base plate fastened in the inside long slide rail, with a bent part bent upwards at an intermediate portion of the base plate;
    a first actuating cam provided on an upper end of a rotating shaft passing through the bent part of the base plate, so that the first actuating cam rotates in conjunction with the rotating shaft;
    a contact rod protruding downwards from both ends of the first actuating cam;
    a connecting arm coupled to a lower end of the rotating shaft at a first end thereof, with an actuating rod protruding downwards from a second end of the connecting arm, so that the connecting arm rotates around the rotating shaft;
    a locking arm provided below the connecting arm, with an elongate hole provided on the locking arm to receive therein the actuating rod of the connecting arm, so that the locking arm moves horizontally by a rotation of the connecting arm in a space defined under the bent part of the base plate;
    an elastic unit provided around the rotating shaft, the elastic unit being coupled to the base plate at a first end thereof while being coupled to the first actuating cam at a second end thereof, thus providing a restoring force to the rotating cam while the rotating cam rotates;
    an actuating plate provided around each of opposite sides of the first actuating cam to slide horizontally on the base plate, thus actuating each of the contact rods; and
    an actuating block provided on each of the actuating plates to be in contact with the power transmission unit,
    wherein, when a drive power is transmitted from the power transmission unit to the actuating block to actuate the locking arm horizontally, the locking unit unlocks the inside long slide rail from the outside long slide rail.

3. The detachable seat according to claim 2, wherein the power transmission unit comprises:
    a fastening bracket fastened to the seat frame;
    a connecting block rotatably provided on a front part of the fastening bracket while being integrally coupled to a lever at a first end thereof, with a guide pin protruding from a second end of the connecting block;
    a spring coupled at a first end thereof to the second end of the connecting block, on which the guide pin is provided, and coupled at a second end thereof to the fastening bracket; and
    an actuating link rotatably coupled to a rear part of the fastening bracket at an intermediate portion thereof, the actuating link being in contact with the actuating block of the locking unit at a first end thereof, with a guide hole provided on a second end of the actuating link to receive the guide pin of the connecting block therein.

4. The detachable seat according to claim 1, wherein the seat detachment unit comprises:
    the front lock coupled to a lower portion of a front part of the seat frame by a hinge to be coupled to the first and second strikers of the inside long slide rail;
    the rear lock coupled to a lower portion of a rear part of the seat frame by a hinge while being coupled to the seat tumbling unit through a cable, the rear lock being coupled to the third striker of the inside long slide rail; and a link unit rotatably coupled to the front lock at a first end thereof while being coupled to the rear lock at a second end thereof, wherein the front and rear locks simultaneously rotate around the hinges by which the front and rear locks are coupled to the seat frame.

5. The detachable seat according to claim 4, wherein the front lock comprises:

a first hook to be locked to the first striker of the inside long slide rail;

a second hook to be locked to the second striker of the inside long slide rail;

a front locking plate placed between the first and second hooks, with a protrusion provided at a predetermined upper position on the front locking plate to pass through the seat frame, first and second locking notches to receive the first and second strikers therein, respectively, and a front roller provided at a predetermined position on the front locking plate;

a spiral spring fastened to the protrusion of the front locking plate at an inner end thereof while being fastened to the seat frame at an outer end thereof;

a first spring coupled to the first hook at a first end thereof and coupled to the front locking plate at a second end thereof;

an actuating arm coupled to the second hook by a coupling pin passing through the front locking plate to be integrally actuated together, the actuating arm inserted at an end thereof into an insert notch provided on the first hook; and a second spring being in close contact with an upper portion of the actuating arm at an end thereof while being fastened to the front locking plate.

6. The detachable seat according to claim 4, wherein the rear lock comprises:

a third hook to be locked to the third striker of the inside long slide rail, with a stop notch provided at a predetermined position on the third hook;

a first rear locking plate rotatably mounted to the seat frame while the third hook is mounted at a predetermined position thereof on the first rear locking plate by a hinge, with a rear roller provided at a predetermined position on the first rear locking plate;

a first stopper mounted at a predetermined position on the first rear locking plate by a hinge, the first stopper being inserted into a stop notch of the third hook at an end thereof;

a second rear locking plate, comprising: a second stopper coupled to the seat tumbling unit and having a same rotating shaft as the first stopper to be operated together; a first guide hole to receive a protrusion of the third hook therein; and a second guide hole to receive a protrusion of the first stopper therein; and a spring coupled at a first end thereof to an end of the protrusion of the third hook passing through the first guide hole of the second rear locking plate, and coupled at a second end thereof to an end of the protrusion of the first stopper passing through the second guide hole of the second rear locking plate.

7. The detachable seat according to claim 1, wherein the seat tumbling unit comprises:

a seat back bracket provided at a predetermined position on a sidewall of the seat back part of the detachable seat;

a seat cushion bracket provided at a predetermined position on the seat cushion part of the detachable seat while being coupled to the seat back bracket by a main hinge;

a sub-rotor having an L-shaped appearance and coupled to the main hinge at an intermediate portion thereof while being coupled to the seat back bracket at an upper end thereof;

a second actuating cam coupled at a contact part constituting the second actuating cam to a lower end of the sub-rotor by a hinge;

an elastic spring provided around the hinge shaft coupling the second actuating cam to the sub-rotor, the elastic spring being coupled to the sub-rotor at a first end thereof while being coupled to the second actuating cam at a second end thereof;

an actuating lever having a T-shaped appearance and mounted at an intermediate portion thereof to a lower end of the seat cushion bracket by a hinge to rotate in a predetermined direction, the actuating lever being coupled to the cable of the rear lock;

an actuating spring provided around the hinge shaft of the actuating lever, so that the actuating spring is coupled to the hinge shaft of the actuating lever at a first end thereof and is coupled to a predetermined portion of the actuating lever at a second end thereof; and a cable bracket provided on the lower end of the seat cushion bracket to guide and support the cable of the rear lock thereon, with a stop protrusion provided at a predetermined position on the cable bracket to be in contact with an end of the actuating lever.

8. The detachable seat according to claim 7, wherein the second actuating cam comprises: the contact part coupled to the sub-rotor by the hinge to be in contact with the actuating lever at an end of the contact part, with a spring insert hole provided on the contact part to receive the elastic spring therein; and a support protrusion being perpendicular to the contact part to be in contact with a side edge of the sub-rotor.

9. The detachable seat according to claim 7, wherein the actuating lever comprises: a first part having a contact protrusion thereon to be in contact with the second actuating cam; a second part coupled to the cable of the rear lock; and a third part to be in contact with the cable bracket provided on the seat cushion bracket, so that the first, second and third parts of the actuating lever are arranged at right angular intervals, and a junction part among the first, second and third parts is coupled to the seat cushion bracket by the hinge.

* * * * *